Z. J. PLAMONDON.
HORSESHOEING MACHINE.
APPLICATION FILED MAR. 26, 1912.
1,035,734.
Patented Aug. 13, 1912.
3 SHEETS—SHEET 1.
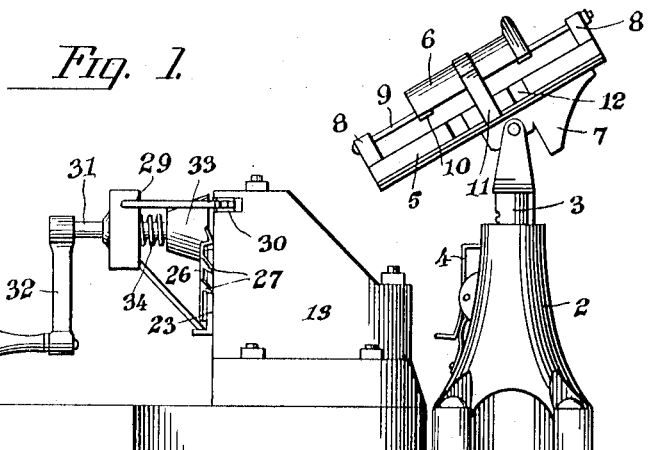
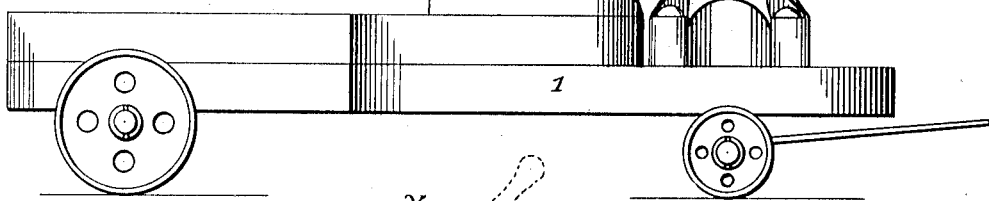
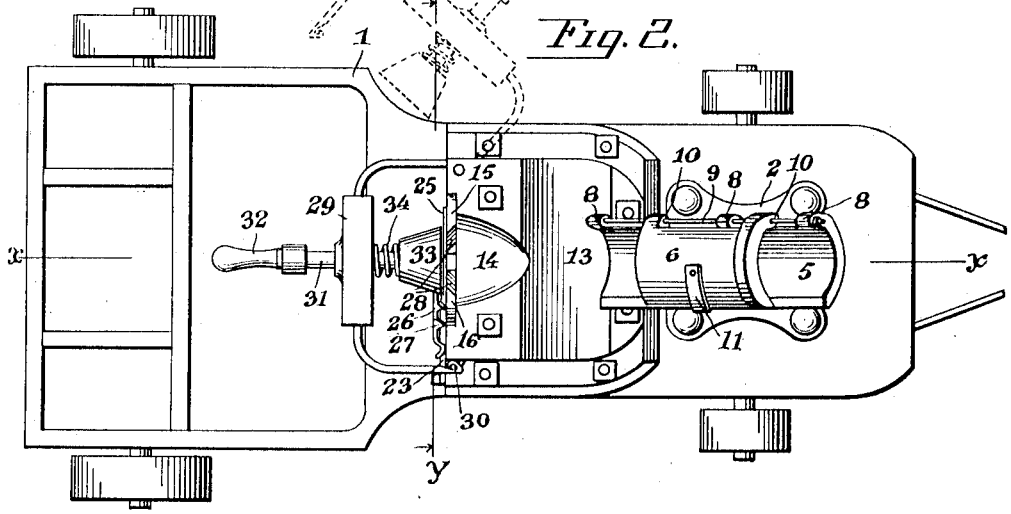
Inventor
Z. J. Plamondon
Witnesses
By Victor J. Evans,
Attorney

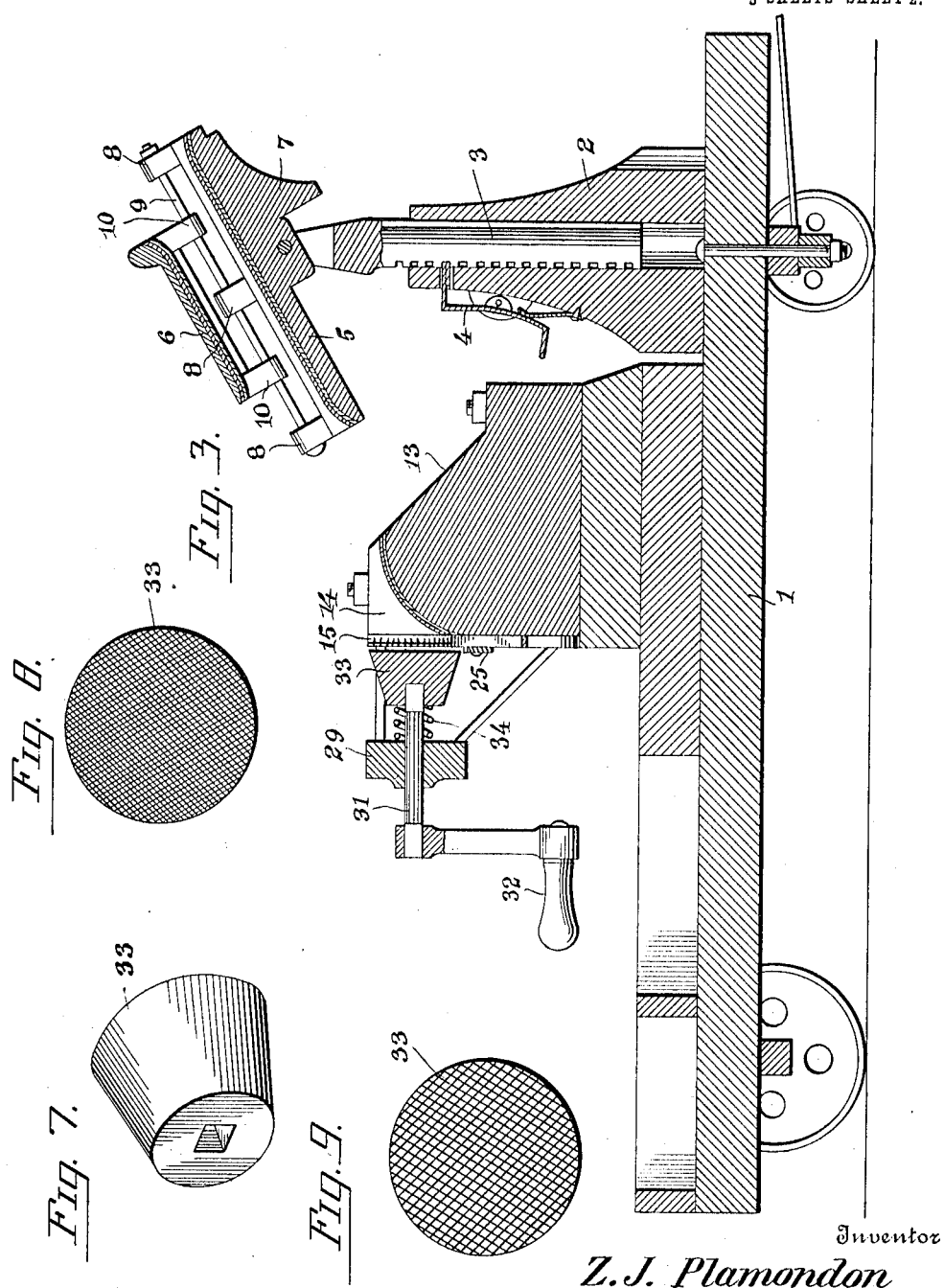

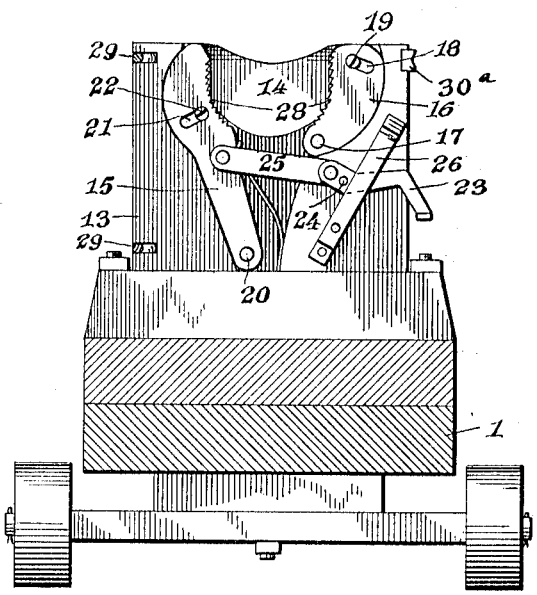
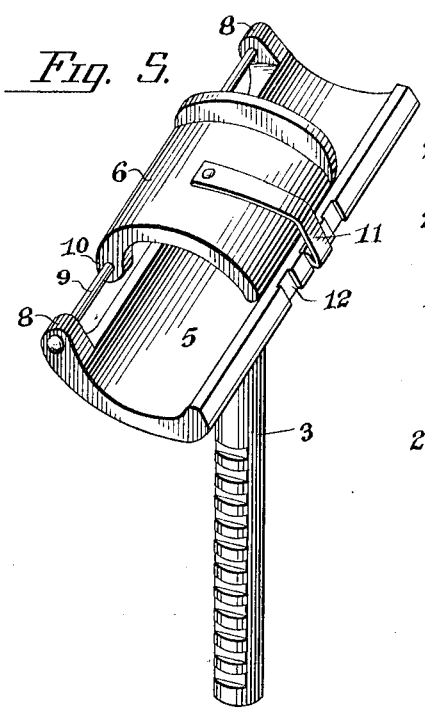
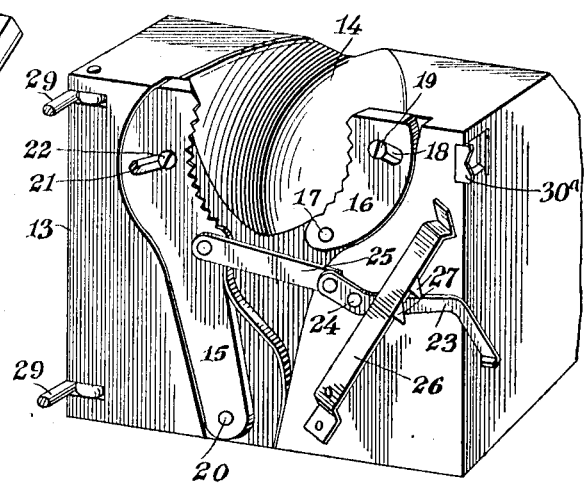

UNITED STATES PATENT OFFICE.

ZIM J. PLAMONDON, OF ISADORE, MICHIGAN.

HORSESHOEING-MACHINE.

1,035,734. Specification of Letters Patent. Patented Aug. 13, 1912.

Application filed March 26, 1912. Serial No. 686,307.

*To all whom it may concern:*

Be it known that I, ZIM J. PLAMONDON, a citizen of the United States, residing at Isadore, in the county of Leelanau and State of Michigan, have invented new and useful Improvements in Horseshoeing-Machines, of which the following is a specification.

This invention provides a machine to facilitate the work of the farrier as also to insure safety both to the animal and to the workman, particularly when shoeing fractious animals or such as are difficult of shoeing because of the difficulty experienced in holding the foot in proper position.

The present invention provides a machine which is mounted upon a truck so as to be easily trundled into position to receive the leg of the animal to be shod, said machine embodying clamps for confining the leg, thereby preventing the animal from injuring the workman during the operation of trimming the hoof and fitting and securing the shoe to the foot.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a side elevation of a horseshoeing machine embodying the invention. Fig. 2 is a top plan view thereof, the dotted lines showing the frame which supports the cutting mechanism swung to one side. Fig. 3 is a vertical longitudinal section on the line x—x of Fig. 2. Fig. 4 is a transverse section on the line y—y of Fig. 2, looking toward the front. Fig. 5 is a detail view of the leg clamp. Fig. 6 is a detail view of the hoof gripping members the supporting block and operating means therefor. Fig. 7 is a detail view of one of the rotary cutters. Figs. 8 and 9 are face views of different rotary cutters.

Corresponding and like parts are referred to in the following description, and indicated in all the views of the drawings, by the same reference characters.

The machine embodies a truck upon which the working parts are mounted to admit of rolling the machine into the required position. The truck embodies a platform 1. A tray is provided upon the rear portion of the truck and is subdivided into cells or compartments for receiving the different nails, tools and sundry articles used by the farrier during the operation of shoeing a horse. A standard 2 is located upon the front portion of the platform and has a vertical opening in which a post 3 is mounted and adapted to be adjusted vertically and to be secured in the adjusted position by means of a latch 4 pivoted to a side of the standard. The post 3 is prevented from turning in the standard, thereby holding the leg clamp in line with the foot rest and hoof clamp. The upper end of the post 3 is forked and pivotally supports the leg clamp.

The leg clamp comprises a lower member 5 and an upper member 6, the two members being pivotally connected at one of their edges. The inner or opposing sides of the members 5 and 6 are padded to prevent injury to the leg of the animal when the same is confined to hold the foot in position for shoeing. The lower member 5 is pivotally connected to the upper end of the post 3, thereby admitting of the leg clamp having a limited pivotal movement in a vertical plane. A lug 7 pendent from the outer portion of the member 5 serves as a stop to prevent the front portion of the leg clamp from tilting downwardly too far. The lug 7 is adapted to engage the front side of the post 3. The clamp member 6 is adjustable along the length of the lower member 5, thereby adapting the leg clamp for animals of different heights. A plurality of lugs 8 are provided along one edge of the member 5 and support a rod 9. The member 6 has pendent lugs 10 at one edge which are apertured to receive the rod 9, thereby admitting of the member 6 sliding upon the rod 9 as well as swinging thereon into open or closed position. A catch 11 is fitted to the clamp member 6 and is adapted to engage the clamp member 5 to hold the two members closed when the leg of the animal is confined between them. The catch 11 is of the spring variety and is adapted to enter one of a number of notches 12 formed in the edge of the member 5 opposite that provided with the lugs 8. The inner or rear end of the member 5 flares slightly and the outer or forward end of the member 6 flares slightly. This construction enables the clamp to grip the leg of the animal without causing much annoyance which would tend to produce fretting.

A block 13 is mounted upon the intermediate portion of the platform 1 and constitutes a rest for the foot as well as a support for the hoof clamp and the hoof trimming or cutting mechanism. The block 13 tapers upwardly and has a padded recess 14 in its upper end to receive the foot of the animal, said recess conforming approximately to the front portion of the hoof. The rear side of the block 13 is approximately in a vertical plane and is recessed to receive the members comprising the hoof clamp. The hoof clamp comprises somewhat similar members, the chief difference residing in the length, one being longer than the other. These members are indicated at 15 and 16. The shorter member 16 is pivoted at 17 and has a transverse slot 18 near its upper end to receive a fastening 19 which is threaded into the block 13 so as to secure the member 16 in the required adjusted position. The member 15 is pivoted at 20 and has a transverse slot 21 a short distance from its upper end in which operates a fastening 22 to hold the upper portion of the member to the block. The member 16 when adjusted is made secure by means of the fastening 19, but the member 15 is free to move so as to grip or release the foot upon operating a lever 23 which is pivoted at 24 to the block 13, a link 25 connecting the inner end of the lever 23 with the member 15. A toothed bar 26 is adapted to secure the lever 23 and the member 15 in the required position. The tooth bar 26 consists of a heavy spring which is secured at one end to the block, its opposite end being free to be moved away from the block to disengage the teeth of the bar from the lever so that the latter may be moved. The teeth 27 of the spring bar 26 are beveled along one edge to admit of the lever 23 riding thereon when moving the lever to advance the gripping end of the member 15 toward the gripping end of the member 16. The gripping portions 28 of the members 15 and 16 are curved, beveled and toothed, the curvature corresponding approximately to the form and the bevel being the reverse of the slant of a horse's hoof and the teeth extending transversely of the gripping edges so as to prevent slipping of the hoof.

The hoof trimming or cutting mechanism is mounted upon a swinging frame 29 which is pivotally connected to the block 13 at or near one side, said frame being adapted to be secured to the opposite portion of the block 13 when occupying a position to bring the cutting mechanism in position for trimming a hoof. When the frame is swung into position opposite the block 13 it is made secure by means of a catch or fastening means of any type. As shown the frame terminates in the hook 30, which is adapted to engage a stop 30ª arranged at the side of the block opposite that to which the frame is hinged. A shaft 31 is mounted in an opening formed centrally of the swinging frame, said shaft being adapted to have a crank 32 fitted to its outer end and a rotary cutter 33 attached to its inner end. The shaft 31 has both a rotary and a longitudinal movement. A spring 34 mounted upon the inner portion of the shaft 31 is adapted to engage the rotary cutter 33 and press the same against the hoof so as to cut or trim the same when a rotary movement is imparted to the cutter upon turning the shaft 31 by means of the crank 32. The spring 34 is expansible and of helical form. The rotary cutter 33 is of circular form and has a socket in one side to receive the inner end of the shaft 31, the face of the cutter being roughened in any well known manner to provide cutting edges similar to a rasp or file. By having the rotary cutter 33 detachably fitted to the shaft 31 different cutters may be fitted to the shaft, thereby enabling a coarse cutter being placed in position for the initial trimming of the hoof and other cutters being employed having finer cutting edges so that the trimming or cutting of the hoof may be accomplished by stages as required.

When it is required to fit a shoe to the hoof of a horse the machine is trundled into position so that when the leg of the animal is lifted it may be placed upon the lower member 5 of the leg clamp with the foot resting in the recess 14 of the block 13. The leg so positioned is confined by swinging the member 6 thereover and fastening the same in closed position. The foot is made secure to the block 13 by moving the lever 23, thereby closing the gripping members 15 and 16. After the old shoe has been removed from the foot, which may be effected in the usual manner, the frame 29 is swung across the block 13, thereby bringing the cutting mechanism opposite the hoof and after the frame has been made secure the crank 32 is turned, thereby rotating the cutter 33 and after the coarse cutter, which is first placed in position, has removed a sufficient amount of the hoof it is replaced by a finer cutter and the trimming operation continued until the desired result is accomplished, when the frame 29 is released and swung out of the way, as indicated by the dotted lines in Fig. 2, thereby admitting of fitting the shoe to the foot and nailing the same thereto in the usual manner.

It will be understood from the foregoing, taken in connection with the accompanying drawings, that the invention provides a machine which will admit of holding the foot of a horse securely during the several stages of the shoeing operation, thereby preventing injury to the workman or to the animal being shod and especially is this the case when shoeing animals that are fractious or are difficult to shoe because of their nervous temperament.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In a farrier's machine, a leg clamp comprising relatively upper and lower members, the upper member having pivotal and sliding connection with the lower member, and means for securing the upper member to the lower member in the adjusted position.

2. In a farrier's machine, a leg clamp comprising a lower member, a rod at one side of the lower member, an upper member mounted upon said rod to turn and to slide thereon, and means carried by the upper member to secure the same to the lower member in any adjusted position when closed.

3. In a farrier's machine, the combination of a block adapted to form a support for the foot of a horse and having a recess in a vertical side, and a hoof clamp comprising similar members arranged in the recess and adapted to secure the foot when in position upon the block.

4. In a farrier's machine, the combination of a block having a recess in its upper end to receive the foot of the animal, and a hoof clamp comprising similar members arranged upon opposite sides of the said recess to engage with and secure the foot of the animal when in position upon the block.

5. In a farrier's machine the combination of a block adapted to support a horse's foot, a frame pivoted to one side of the block and adapted to swing across the horse's foot, means for securing the swinging end of the frame to the opposite side of the block, and a hoof trimmer mounted upon the swinging frame and movable therewith.

6. In a farrier's machine the combination of a block having a hoof receiving recess in its upper side, a hoof clamp mounted upon the outer side of the block, a frame pivoted to one side of the block and adapted to swing across the hoof clamp, means for securing the swinging end of the frame to the opposite side of the block, and a hoof trimmer carried by the swinging frame.

In testimony whereof I affix my signature in presence of two witnesses.

ZIM J. PLAMONDON.

Witnesses:
ELLSWORTH BILLMAN,
ELMER BILLMAN.

---

Copies of this patent may be obtained for five cents each, by addressing the "Commissioner of Patents, Washington, D. C."